(12) United States Patent
Yoshikawa

(10) Patent No.: US 10,156,780 B2
(45) Date of Patent: Dec. 18, 2018

(54) FLUORESCENT SUBSTANCE WHEEL DEVICE, LIGHT CONVERSION DEVICE PROVIDED WITH SAME, AND PROJECTION DISPLAY APPARATUS

(71) Applicant: Panasonic Intellectual Property Management Co., Ltd., Osaka (JP)

(72) Inventor: Tsutomu Yoshikawa, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/946,748

(22) Filed: Apr. 6, 2018

(65) Prior Publication Data

US 2018/0224731 A1    Aug. 9, 2018

Related U.S. Application Data

(63) Continuation of application No. PCT/JP2016/005023, filed on Nov. 30, 2016.

(30) Foreign Application Priority Data

Dec. 10, 2015    (JP) ................. 2015-241358

(51) Int. Cl.
*G03B 21/14*    (2006.01)
*H04N 9/31*    (2006.01)
(Continued)

(52) U.S. Cl.
CPC .............. *G03B 21/16* (2013.01); *G02B 5/20* (2013.01); *G02B 26/008* (2013.01); *G03B 21/14* (2013.01);
(Continued)

(58) Field of Classification Search
CPC .... G03B 21/14; G03B 21/204; G03B 21/208; G03B 21/2013; G03B 21/2066;
(Continued)

(56) References Cited

U.S. PATENT DOCUMENTS 6,618,213 B2 *    9/2003    Inamoto ................. F04D 17/08
                                                      348/743
8,678,597 B2 *    3/2014    Nishimura ............. G03B 21/16
                                                      353/119
(Continued)

FOREIGN PATENT DOCUMENTS

JP    2002-090886    3/2002
JP    2003-156796    5/2003
(Continued)

OTHER PUBLICATIONS

International Search Report of PCT application No. PCT/JP2016/005023 dated Feb. 21, 2017.

*Primary Examiner* — William C Dowling
(74) *Attorney, Agent, or Firm* — Wenderoth, Lind & Ponack, L.L.P.

(57) ABSTRACT

The phosphor wheel device includes a phosphor wheel, a circulation fan, a motor and a casing unit. The phosphor wheel is disc-shaped, and includes an annular phosphor layer formed on a first face and a plurality of openings disposed on an inner circumferential side. The circulation fan is mounted to a second face opposite to the first face, and blows air through the openings to the phosphor layer side. The motor drives and rotates the phosphor wheel and the circulation fan. The casing unit accommodates the phosphor wheel, the circulation fan, and the motor, and includes a circulation path formed for an airflow generated by the circulation fan to circulate. The casing unit includes an outer cylindrical portion and an inner cylindrical portion disposed substantially concentrically inside the outer cylindrical por- (Continued)

tion. Both ends of the outer cylindrical portion communicate with both ends of the inner cylindrical portion.

17 Claims, 15 Drawing Sheets

(51) Int. Cl.
    *G03B 21/16*     (2006.01)
    *G02B 5/20*     (2006.01)
    *H04N 5/74*     (2006.01)
    *G02B 26/00*     (2006.01)
    *G03B 21/20*     (2006.01)

(52) U.S. Cl.
    CPC ............. *G03B 21/204* (2013.01); *H04N 5/74* (2013.01); *G03B 21/208* (2013.01); *G03B 21/2066* (2013.01)

(58) Field of Classification Search
    CPC ........ G03B 21/16; H04N 9/31; H04N 9/3152; H04N 9/3161; H04N 9/3164; G02B 27/10; G02B 27/18; G02B 27/1006; G02B 27/1053; G02B 26/008
    See application file for complete search history.

(56) References Cited

U.S. PATENT DOCUMENTS

| | | | |
|---|---|---|---|
| 9,664,893 B2 * | 5/2017 | Yamagishi | G02B 26/008 |
| 9,915,858 B2 * | 3/2018 | Chikayama | G03B 21/16 |
| 9,983,467 B2 * | 5/2018 | Kitade | G03B 33/08 |
| 2002/0003704 A1 | 1/2002 | Ohmae et al. | |
| 2003/0095349 A1 | 5/2003 | Inamoto | |
| 2004/0095767 A1 | 5/2004 | Ohmae et al. | |
| 2012/0013854 A1 | 1/2012 | Nishimura et al. | |
| 2012/0229780 A1 | 9/2012 | Sato | |
| 2013/0169938 A1 | 7/2013 | Huang et al. | |
| 2015/0131062 A1 | 5/2015 | Nishimori et al. | |
| 2016/0077326 A1 * | 3/2016 | Yamagishi | G02B 26/008 |
| | | | 353/61 |
| 2018/0088317 A1 * | 3/2018 | Yoshikawa | G02B 5/20 |
| 2018/0095350 A1 * | 4/2018 | Tanaka | G03B 21/16 |

FOREIGN PATENT DOCUMENTS

| | | |
|---|---|---|
| JP | 2012-181431 | 9/2012 |
| JP | 2012-185369 | 9/2012 |
| JP | 2014-092599 | 5/2014 |
| JP | 2015-094860 | 5/2015 |
| WO | 2010/116444 | 10/2010 |

* cited by examiner

FLUORESCENT SUBSTANCE WHEEL DEVICE, LIGHT CONVERSION DEVICE PROVIDED WITH SAME, AND PROJECTION DISPLAY APPARATUS

BACKGROUND

Technical Field

The present disclosure relates to a phosphor wheel device, a light conversion device, and a projection display apparatus. The light conversion device and the projection display apparatus are both provided with the phosphor wheel device.

Description of the Related Art

The projection display apparatus generally employs a light conversion device using laser diodes as a light source, which emits light to excite the phosphor. The phosphor then generates fluorescent emission to be used as light. This structure; however, needs to prevent the temperature from rising in order to maintain the temperature characteristics of light conversion efficiency of the phosphor per se and the heat resistance of a binder to be used for binding the phosphor onto a substrate.

To achieve the foregoing objective, a phosphor layer is formed on a disc-shaped substrate, which is then mounted to a motor for rotation, thereby moving always a fluorescent-emitting section to prevent the temperature from rising. Nevertheless, an attachment of dust to the excited light will invite a burn-in on the phosphor surface. As a result, the light emission efficiency will be lowered.

To overcome this problem, patent literature 1 (Unexamined Japanese Patent Application Publication No. 2014-92599) introduced below discloses that the phosphor is disposed in an enclosed space to prevent the dust, and at the same time, a cooling fan is placed in the enclosed space for cooling. This is a structure generally used today.

A cooling fan other than the foregoing cooling fan is also known and disclosed in patent literature 2 (Unexamined Japanese Patent Application Publication No. 2012-181431). This cooling fan is coaxial with the disc-shaped substrate and driven with the same power source as that of the disc-shaped substrate.

Nevertheless, the projection display apparatus uses higher brightness than before, so that excited light becomes greater. This tendency requires much more cooling capability. The placement of the motor in the enclosed space causes the motor temperature to rise, which prevents the motor from exerting its expected performance.

To overcome this problem, patent literature 3 (Unexamined Japanese Patent Application Publication No. 2015-94860) below discloses that the motor is disposed outside the enclosed space.

The conventional light conversion devices discussed above; however, still encounter the problems as follows: the light conversion devices disclosed in the foregoing patent literatures need lenses disposed closely to the phosphor layer provided on the surface of the phosphor wheel. In the case of the structure disclosed in patent literature 2, for instance, the cooling fan is closely disposed to the phosphor wheel, so that it is difficult to get a space for the lens to be closely disposed to the phosphor layer.

CITATION LIST

Patent Literature

PTL 1: Unexamined Japanese Patent Application Publication No. 2014-92599

PTL 2: Unexamined Japanese Patent Application Publication No. 2012-181431

PTL 3: Unexamined Japanese Patent Application Publication No. 2015-94860

SUMMARY

The phosphor wheel device in accordance with the present disclosure includes a phosphor wheel, a circulation fan, a motor and a casing unit. The phosphor wheel is disc-shaped, and includes an annular phosphor layer formed on a first face of the phosphor wheel and a plurality of openings disposed on an inner circumferential side of the annular phosphor layer. The circulation fan is mounted to a second face opposite to the first face including the phosphor layer formed on the first face of the phosphor wheel, and blows air through the openings to the phosphor layer side. The motor drives and rotates the phosphor wheel and the circulation fan. The casing unit accommodates the phosphor wheel, the circulation fan, and the motor, and includes a circulation path formed in the casing unit for an airflow generated by the circulation fan to circulate. The casing unit includes an outer cylindrical portion and an inner cylindrical portion disposed substantially concentrically with the outer cylindrical portion inside the outer cylindrical portion. Both ends of the outer cylindrical portion communicate with both ends of the inner cylindrical portion.

The phosphor wheel device in accordance with the present disclosure allows increasing reliability as well as light conversion efficiency, and yet, is useful for maintaining a degree of freedom in placing an optical system of the light source including such as lenses.

DETAILED DESCRIPTION

Exemplary embodiments of the present disclosure will be detailed hereinafter with reference to the accompanying drawings. Descriptions more than necessary will be omitted sometimes. For instance, details of well-known matters or duplicated descriptions of substantially the same structures are omitted. These omissions will avoid redundancy in the descriptions and facilitate the skilled person in the art to understand the embodiments.

The applicant provides the accompanying drawings and the descriptions below for the skilled person in the art to fully understand the present disclosure. These materials will not limit the subject stated in the scope of the claims.

Exemplary Embodiment 1

A phosphor wheel device, a light conversion device and a projection display apparatus both provided with the same phosphor wheel device in accordance with embodiment 1 of the present disclosure are described hereinafter with reference to FIG. 1-FIG. 9.

Projector 100

Projector 100 (projection display apparatus) in accordance with this embodiment is a video display apparatus employing a digital light processing (DLP) method, in which a spatial light modulating device (e.g. digital mirror device=DMD 7) is used. Projector 100 is provided with light conversion device 20 including phosphor wheel device 10 that emits fluorescent light excited with blue LDs 2a, 2b (laser diode), various optical components, and laser beam.

Projector 100 in accordance with this embodiment employs a three-chip DLP method in which three DMDs 7 corresponding to three primary colors (i.e. R, G, and B) are used. Nevertheless, FIG. 1 shows only one DMD 7 for convenience of the description.

Figure 1:
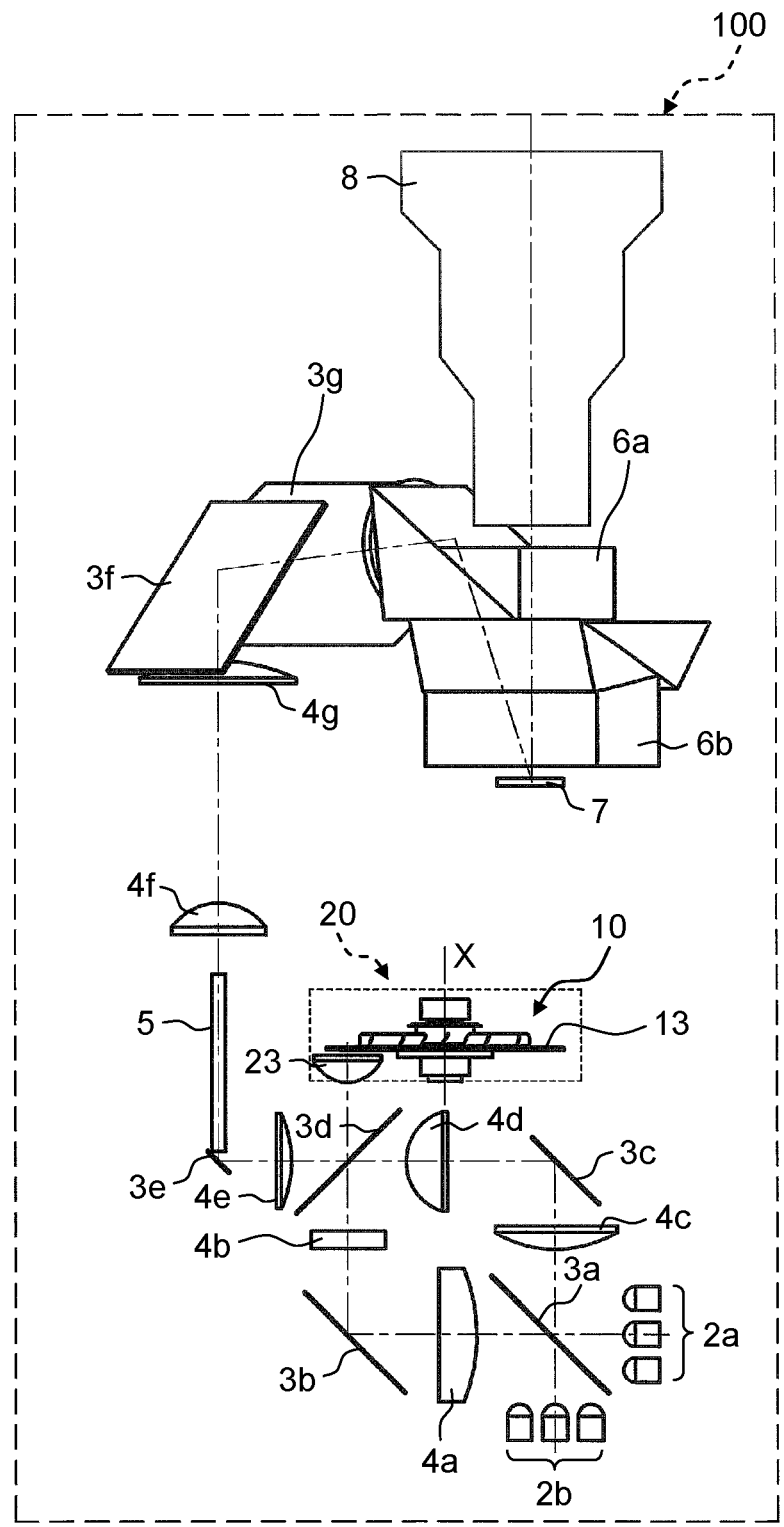
FIG. 1 schematically shows a projection display apparatus in accordance with a first embodiment of the present disclosure.

Projector 100 in accordance with this embodiment is provided with, as shown in FIG. 1, two blue LDs 2a and 2b as light sources, and optical components including separation mirror 3a, mirrors 3b and 3c, dichroic mirror 3d, mirrors 3e, 3f and 3g, lenses 4a-4h, rod integrator 5, TIR (total internal reflection) prism 6a, color prism 6b, DMD 7, and projector lens 8. On top of that, projector 100 includes light conversion device 20.

Blue LDs 2a and 2b are light sources of projector 100, and each of them includes a plurality of LDs along vertical and horizontal lines (m pieces×n pieces). LD 2a and LD 2b are disposed orthogonally to each other, so that the light emitted from LD 2a travels orthogonally to the light emitted from LD 2b.

Separation mirror 3a is disposed near the intersection point where the laser beam emitted from blue LD 2a crosses the laser beam emitted from blue LD 2b, and separates these two laser beams into two directions.

Mirrors 3b and 3c change the traveling direction by 90 degrees of each of the laser beams traveling in two directions separated with separation mirror 3a.

Dichroic mirror 3d is made of special optical material, and reflects light of a specific wavelength as well as transmits the light of other wavelengths. In this embodiment, dichroic mirror 3d transmits the blue laser beam emitted from blue LDs 2a and 2b as well as reflects red light and green light that are converted from the blue laser beam at phosphor wheel device 10 described later.

Mirrors 3e, 3f, and 3g lead the three primary lights (R,G,B) transmitted through or reflected on dichroic mirror 3d to projector lens 8 disposed at the lower-most part of the stream.

Lenses 4a-4g condense or parallelize the blue laser beam emitted from blue LDs 2a and 2b working as the light sources, the red light and the green light that have been converted from the blue laser beam at phosphor wheel device 10.

Rod integrator 5 uniforms a luminous intensity of the incident light. The incident light to rod integrator 5 repeats total reflection on the inner wall face, so that the light is emitted from the outgoing face in uniform distribution of the luminous intensity. Rod integrator 5 is disposed at a place where the light reflected on mirror 3e enters.

TIR (total internal reflection) prism 6a changes a travel direction of the incident light with the aid of the TIR function.

Color prism 6b separates the incident light into three primary colors (R,G,B) and reflects them on three DMDs 7 disposed at the lower side of the stream.

Each of three DMDs 7 is placed correspondingly to each of the three primary colors R, G, B. DMD 7 modulates the incident light with a video signal, and emits the modulated light to projector lens 8 through color prism 6b.

Projector lens 8 is disposed at the lower most side of the optical components mounted to projector 100, and projects and magnifies the incident light through TIR prism 6a, DMDs 7, and color prism 6b onto a screen (not shown).

Light conversion device 20 includes phosphor wheel device 10, and converts the blue light radiated by blue LDs 2a and 2b into red light and green light with the aid of phosphor. The structure of light conversion device 20 including phosphor wheel device 10 is detailed later.

Projecting a Video with Projector 100

The laser beams emitted from two blue LDs 2a and 2b are directed in two directions by separation mirror 3a disposed near the intersection point of these two laser beams.

The first blue laser beam out of the two beams travels through dichroic mirror 3d via lens 4c, mirror 3c, and lens 4d, and then travels through lens 4e. This first blue laser beam then reflects on mirror 3e by 90 degrees, and then enters rod integrator 5.

The second blue laser beam out of the two beams travels through dichroic mirror 3d via lens 4a, mirror 3b, and lens 4b, and then is radiated onto phosphor layer 13a of phosphor wheel 13 of phosphor wheel device 10. At this time, this second laser beam excites a red phosphor and a green phosphor of phosphor layer 13a, and then is converted into red light and green light.

At this time, since phosphor wheel 13 is driven and rotated by motor 14, the burn-in caused by the radiation of the blue laser beam onto the red phosphor and the green phosphor can be prevented.

The red light and the green light converted are reflected on dichroic mirror 3d by 90 degrees, and enters rod integrator 5.

The laser beams of the three primary colors (R,G,B) are mixed with each other in rod integrator 5, and then enter a boundary layer of TIR prism 6a via lens 4f, mirrors 3f and 3g. Since the incident angle of the laser beams of the three primary colors (R,G,B) to the boundary layer is the total reflection angle, the laser beams reflect thereon and travel to color prism 6b.

Color prism 6b lets the lights separated into three primary colors (R,G,B) enter three DMDs 7 respectively.

The light beams forming an image and then reflecting in DMDs 7 are composited in color prism 6b. The light beams then travel through the boundary layer of TIR prism 6a, and enter projector lens 8, so that a video is projected onto a screen.

In projector 100 in accordance with this embodiment, the blue laser beams emitted from blue LDs 2a and 2b working as the excitation light source excite the red phosphor and the green phosphor contained in phosphor layer 13a disposed on the surface of phosphor wheel 13 for generating the red light and the green light. At this time, not all the energy of the blue laser beams is converted into fluorescent light emission, but a part of the energy is converted into heat energy, which increases the temperatures of the red phosphor and the green phosphor.

The phosphors used here have the following characteristics: a temperature rise will lower the light conversion efficiency, and also invite heat fading in the binder to be used for rigidly mounting the phosphors onto phosphor wheel 13. To overcome these problems, phosphor wheel 13 is driven and rotated so that the temperature rise in the phosphors can be prevented.

Nevertheless, an intensity of the excitation light becomes greater as the brightness of projector 100 becomes higher, so that the rotating of phosphor wheel 13 is not enough to cool the phosphor portion, which thus needs to be subjected to cooling air in order to forcibly cool the phosphor.

Figure 5:
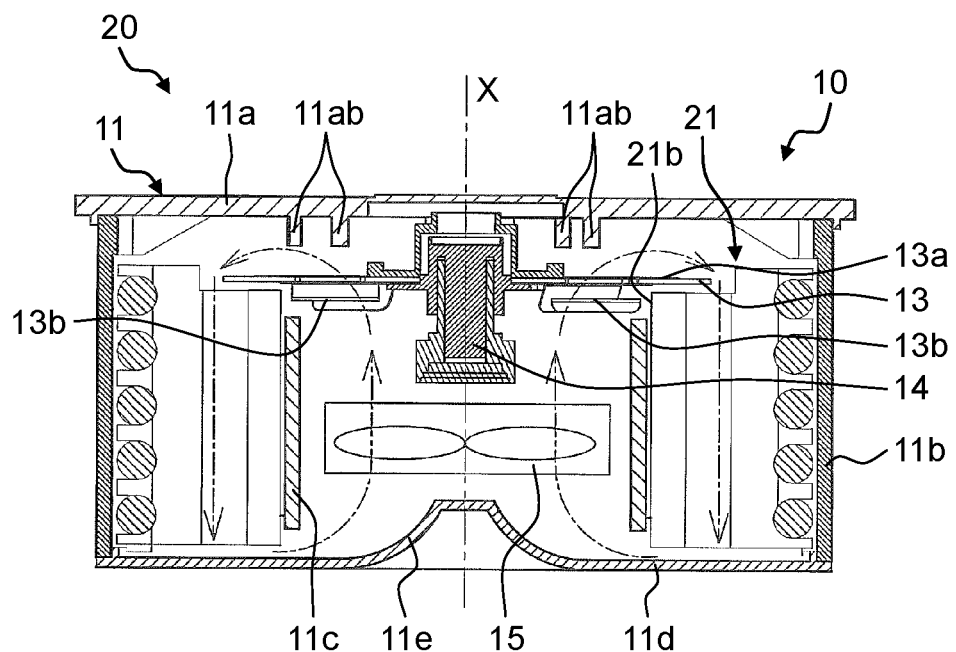
FIG. 5 is a sectional view of an interior structure of the light conversion device shown in FIG. 2.

In this embodiment, as shown in FIG. 5, circulation fan 13b is provided on the side of a second face opposite to a first face, on which phosphor layer 13a is formed, of phosphor wheel 13 to blow the cooling air to phosphor layer 13a.

The structures of phosphor wheel device 10 and light conversion device 20 will be detailed later.

Structure of Light Conversion Device 20

Figure 2:
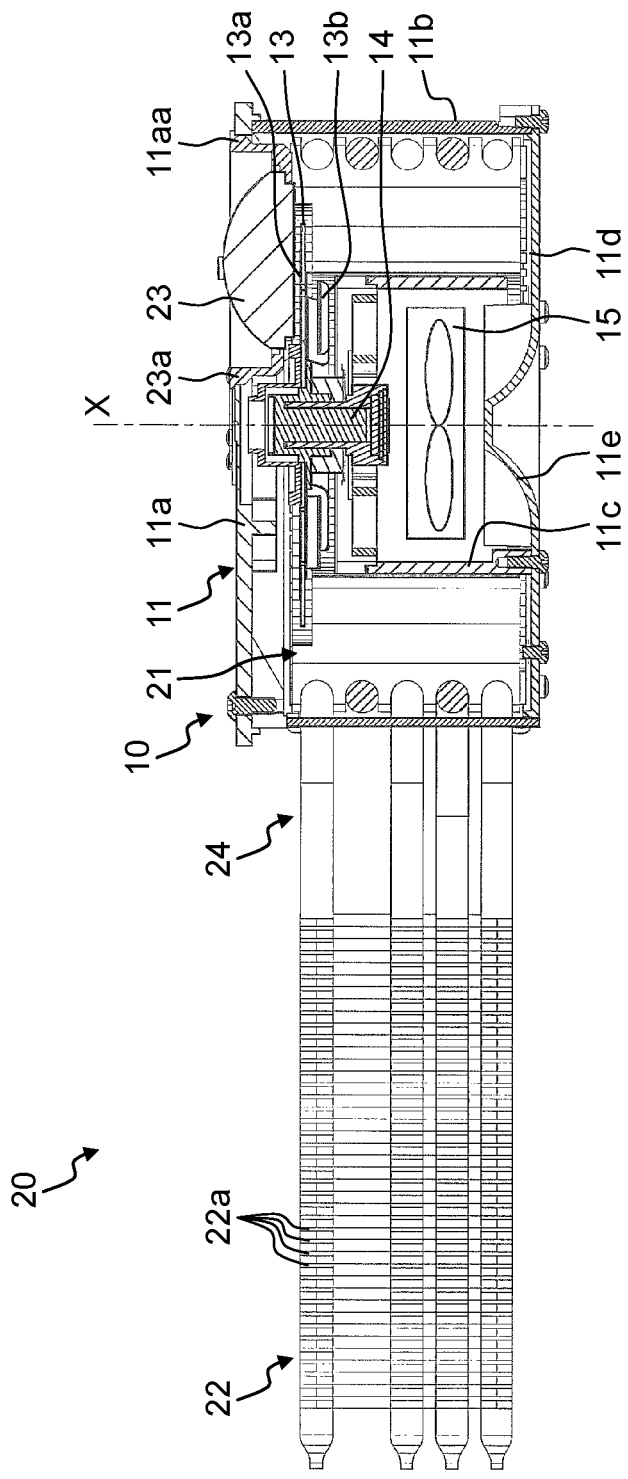
FIG. 2 shows a structure of an essential part of a light conversion device included in the projection display apparatus shown in FIG. 1.

As shown in FIG. 2, light conversion device 20 in accordance with this embodiment includes phosphor wheel 10 of which details are described later, heat absorber 21, heat dissipater 22, optical lens 23, and heat pipe 24.

Phosphor wheel device 10 radiates the incoming blue laser beams onto the phosphor in light conversion device 20, thereby converting the laser beams into the red light and the green light. The structure of phosphor wheel 10 will be detailed later.

Figure 3:
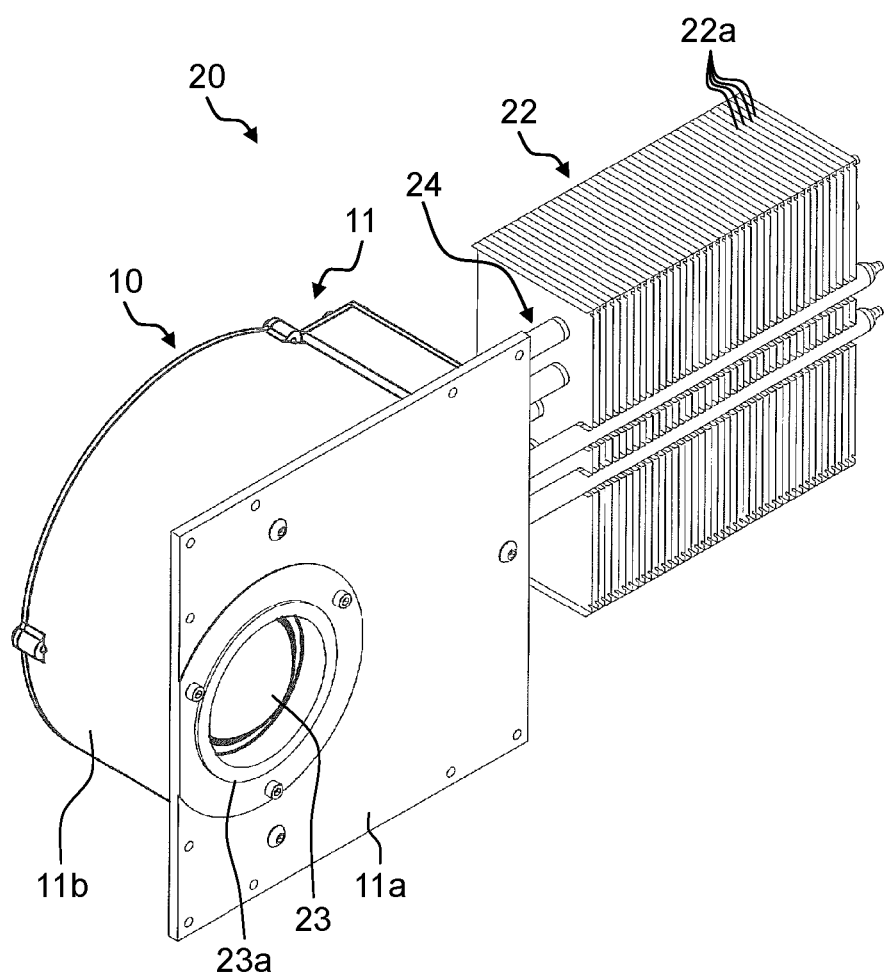
FIG. 3 is an external perspective view of the light conversion device shown in FIG. 2.
Figure 4A:
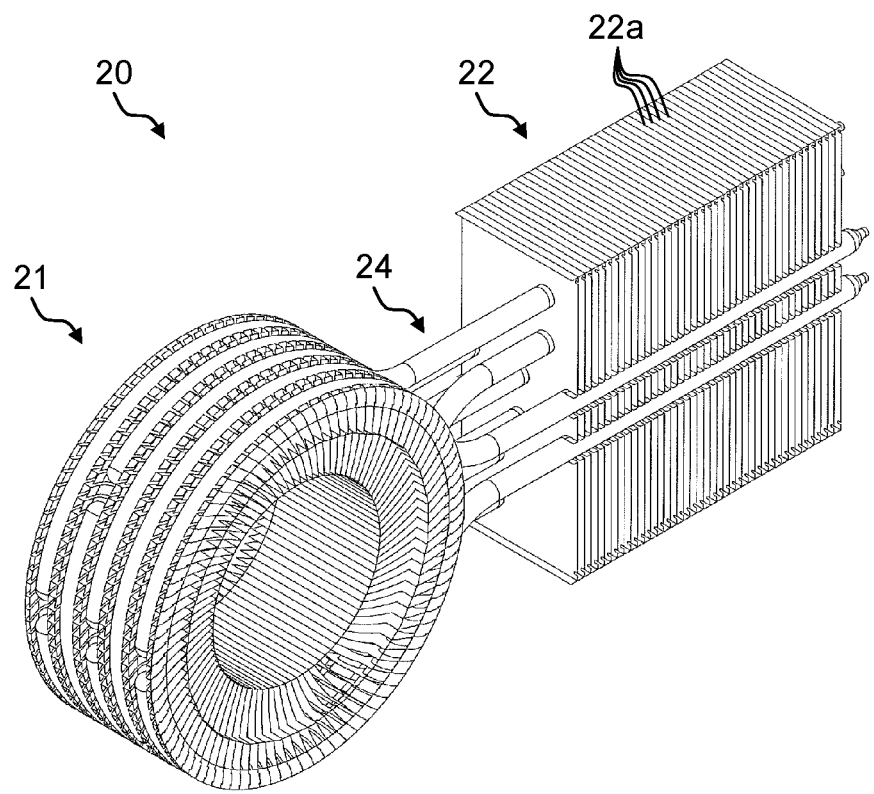
FIG. 4A is a perspective view of a structure in which a heat absorber and a heat dissipater are disposed inside the light conversion device shown in FIG. 2, and the heat dissipater is thermally connected to the heat absorber.

As shown in FIG. 2, heat absorber 21 is disposed inside casing unit 11 of phosphor wheel device 10, and has a fin-structure through which an airflow generated in light conversion device 20 goes, so that heat absorber 21 absorbs heat from the airflow containing the heat generated in phosphor layer 13a formed on phosphor wheel 13. As shown in FIG. 3, heat absorber 21 is rigidly mounted to outer cylindrical portion 11b and bottom portion 11d with screws, and is thermally coupled to heat dissipater 22 via heat pipe 24. As FIGS. 4A and 4B show, heat absorber 21 includes a plurality of fins 21a and fixed wall (wall portion) 21b.

Figure 4B:
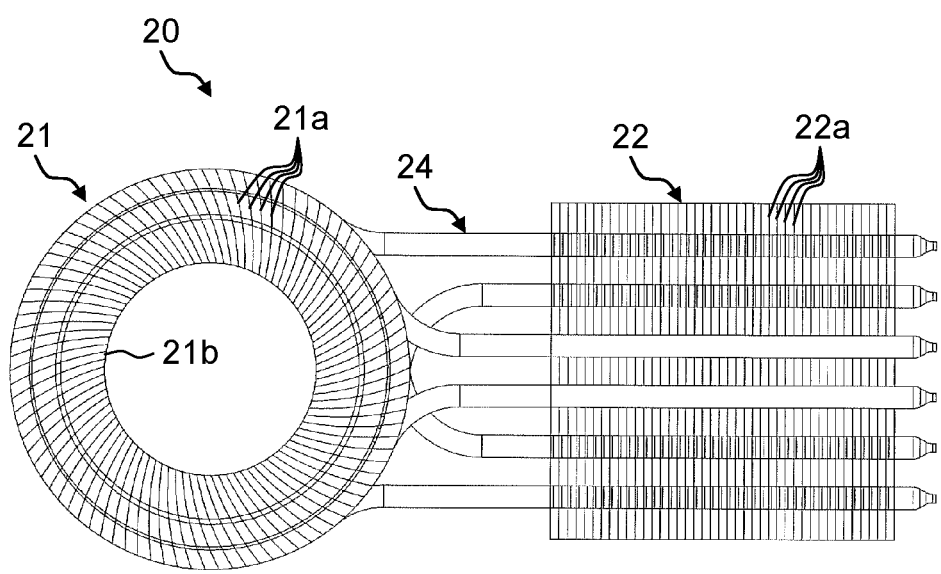
FIG. 4B is a plan view of the structure shown in FIG. 4A.

A plurality of fins 21a are made of metal of high heat conductivity, and disposed in spiral shape in a plan view as FIG. 4B shows. This structure allows guiding the airflow entering the gaps between phosphor wheel 13 and lid portion 11a through openings 13c of phosphor wheel 13 along a radially outward direction.

At this time, since phosphor layer 13a is formed on the first face (confronting lid portion 11a) of phosphor wheel 13, air can be blown effectively around phosphor layer 13a. As a result, the heat generated in the phosphor can be efficiently cooled. When the airflow goes through a plurality of fins 21a, the heat contained in the airflow moves toward fins 21a, thereby lowering the temperature of the airflow.

Fixed wall 21b is a part of the inner circumferential face of heat absorber 21 rigidly mounted to the outer circumferential face of circulation fan 13b, and restraints the airflow, generated by circulation fan 13b during the rotation of phosphor wheel 13, from flowing along the radially outward direction from the rotation center.

The foregoing mechanism thus allows efficiently guiding the airflow generated by circulation fan 13b, through openings 13c of phosphor wheel 13, toward the side on which phosphor layer 13a is formed.

As FIG. 2 shows, heat dissipater 22 is disposed outside casing unit 11 of phosphor wheel device 10, and thermally coupled to heat absorber 21 via heat pipe 24 as shown in FIG. 3 and other drawings. Heat dissipater 22 thus discharges the heat, absorbed in heat absorber 21, of the airflow to the outside of casing unit 11. Heat dissipater 22 is provided with a fin-structure including a plurality of fins 22a disposed on the outer circumferential face.

A plurality of fins 22a are made of metal of high heat conductivity, and disposed along a line orthogonal to the longitudinal line of heat pipe 24, as shown in FIGS. 4A and 4B, for discharging the heat to outside air of casing unit 11.

As FIGS. 2 and 3 show, optical lens 23 is mounted to an opening portion, provided to lid portion 11a of casing unit 11, with optical lens holding component 23a. As shown in FIG. 1, optical lens 23 transmits the excitation light that excites the phosphor of phosphor layer 13a of phosphor wheel 13, and condenses emission light emitted from the phosphor of phosphor layer 13a before guiding the emission light toward dichroic mirror 3d.

As FIGS. 4A and 4B show, heat pipe 24 thermally connects heat absorber 21 to heat dissipater 22. Heat pipe 24 includes a hollow space therein. Water is poured into the hollow space, and the water is vaporized by heat at absorber 21 side, and then moves as steam to dissipater 22 side. The steam arrived at dissipater 22 side is cooled and turned into water there. Then the water moves in the hollow space due to a capillary phenomenon, and arrived at absorber 21 side again.

To be more specific, inside heat pipe 24, a small amount of water is vaporized at heat absorber 21 side, and then turned into water at heat dissipater 22 side, so that the water works as a cooling medium.

Structure of Phosphor Wheel Device 10

Phosphor wheel device 10 in accordance with this embodiment converts the blue light (excitation light) emitted from blue LDs 2a and 2b into red light and green light. As FIG. 2 shows, phosphor wheel device 10 includes casing unit 11, phosphor wheel 13, motor 14, and pressurization fan 15.

As FIG. 2 shows, casing unit 11 forms an enclosed space in the interior space inside a cylindrical shape (refer to FIG. 3) for accommodating phosphor wheel 13, circulation fan 13b, motor 14, heat absorber 21, and others. A circulation path of the airflow generated by circulation fan 13b is formed inside casing unit 11. As FIG. 5 shows, casing unit 11 includes outer cylindrical portion 11b and inner cylindrical portion 11c disposed substantially concentrically and doubly formed. Both the ends of inner cylindrical portion 11c and outer cylindrical portion 11b along X-axis connect with each other. Between inner cylindrical portion 11c and outer cylindrical portion 11b, the circulation path of the airflow is formed.

On top of that, at least a part of the section of casing unit 11 is made of metal, and this section is exposed to the open air. This structure allows casing unit 11 to discharge the heat efficiently to the outside even if the interior of casing unit 11 is warmed by the heat generated in the phosphor of phosphor layer 13a of phosphor wheel 13 disposed in casing unit 11 because casing unit 11 is made of the metal of high heat conductivity.

The part, to be made of metal, of casing unit 11 is preferably lid portion 11a on phosphor wheel 13 side.

In other words, as shown in FIG. 5, the airflow to which the heat generated in the phosphor of phosphor layer 13a is conveyed goes near lid portion 11a before entering heat absorber 21.

The structure discussed above allows discharging the heat effectively to the outside even if lid portion 11a is warmed by the airflow that has passed near phosphor layer 13a of phosphor wheel 13 and has heated. As a result, lid portion 11a can discharge the heat of the airflow to the outside more effectively than other members of casing unit 11 (i.e. outer cylindrical portion 11b, inner cylindrical portion 11c, and bottom portion 11d).

As FIG. 3 shows, lid portion 11a is a plate-like roughly rectangular member, and mounted to casing unit 11 such that lid portion 11a can cover the face of phosphor wheel 13 at phosphor layer 13a side. Opening portion 11aa (refer to FIG. 2) is provided to lid portion 11a for receiving optical lens 23 discussed previously.

Opening portion 11aa is a through-hole provided to lid portion 11a at a place confronting phosphor layer 13a of phosphor wheel 13. Optical lens 23 is mounted to opening portion 11aa with optical lens holding component 23a. The blue laser beam and the excitation light (red and green) travel through optical lens 23.

As FIG. 5 shows, spiral guide 11ab forms projections like ribs protruded from an underside of lid portion 11a at places confronting phosphor layer 13a of phosphor wheel 13.

Figure 6A:
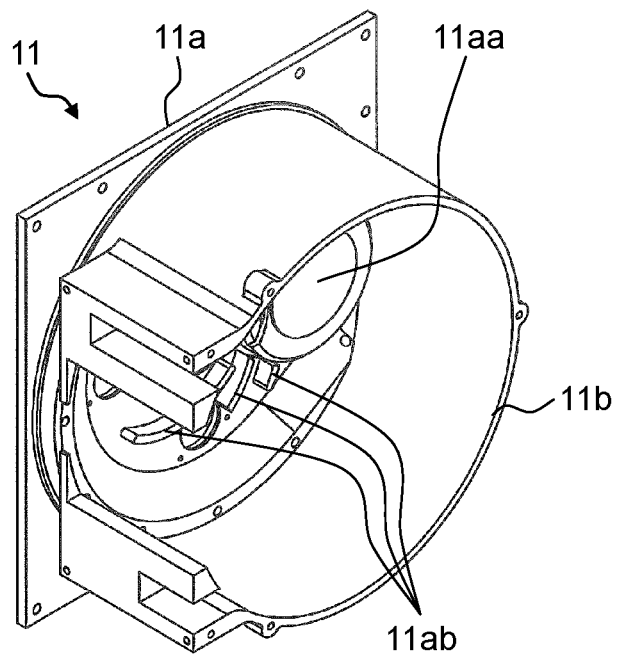
FIG. 6A is a perspective view of a guide formed on an inner surface of a casing unit of the light conversion device shown in FIG. 2.
Figure 6B:
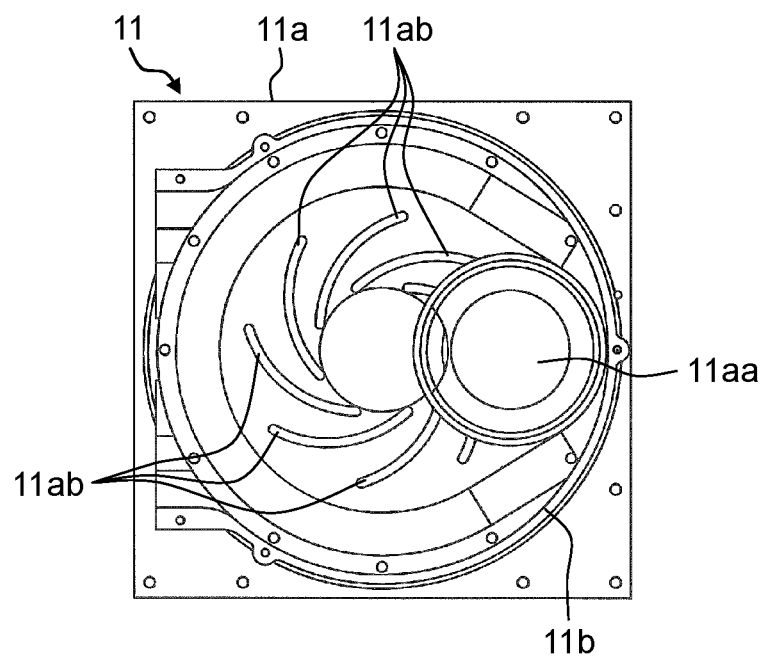
FIG. 6B is a plan view of what is shown in FIG. 6A.

As FIG. 6B shows, the projections of spiral guide 11ab form spiral shapes concentrically with the rotation center of phosphor wheel 13.

This structure allows guiding the airflow, generated by circulation fan 13b mounted on the second face of phosphor wheel 13, radially outward for efficiently blowing this airflow close to phosphor layer 13a of phosphor wheel 13.

As FIGS. 3 and 6A show, outer cylindrical portion 11b is a roughly cylindrical member forming a lateral face of casing unit 11, and has an open portion on the side where heat absorber 21 accommodated in casing unit 11 is to be connected to heat dissipater 22 disposed outside casing unit 11. The open portion is covered with a lid so that casing unit 11 can be air-tightly closed.

As FIG. 5 shows, inner cylindrical portion 11c is a cylindrical member disposed concentrically with outer cylindrical portion 11b, and disposed inside the outer cylindrical portion 11b such that it is adjacent to the inner circumferential side of heat absorber 21. On top of that, inner cylindrical portion 11c, as shown in FIG. 5, has a smaller dimension along X-axis than outer cylindrical portion 11b.

As the sectional view of FIG. 5 shows, the foregoing structure allows outer cylindrical portion 11b to communicate with inner cylindrical portion 11c at both the ends along X-axis.

The rotation of phosphor wheel 13 allows the airflow generated by circulation fan 13b to pass from the inner circumferential side of inner cylindrical portion 11c through the communicating portion on the phosphor wheel 13 side. Spiral guide 11ab of lid portion 11a then guides the airflow close to phosphor layer 13a of phosphor wheel 13 and along radially outward direction of wheel 13. The airflow moves downward along X-axis, as shown in FIG. 5, and passes through heat absorber 21 for being cooled. The airflow cooled is returned to the inner circumferential side of inner cylindrical portion 11c again from the communicating portion on the side opposite to phosphor wheel 13.

Bottom portion 11d, as shown in FIG. 5, is mounted such that it covers the face opposite to lid portion 11a with respect to X-axis.

As FIG. 5 shows, updraft guide 11e is a guide member for providing the airflow having been cooled through heat absorber 21 with inverse updraft, and disposed on bottom portion 11d at the interior space side of casing unit 11. Updraft guide 11e is shaped like roughly a corn of which center is axis X, and guides the airflow flowing from the outer circumferential side to the inner circumferential side such that the airflow rises with the aid of the wind force generated by circulation fan 13b and pressurization fan 15.

Figure 7A:
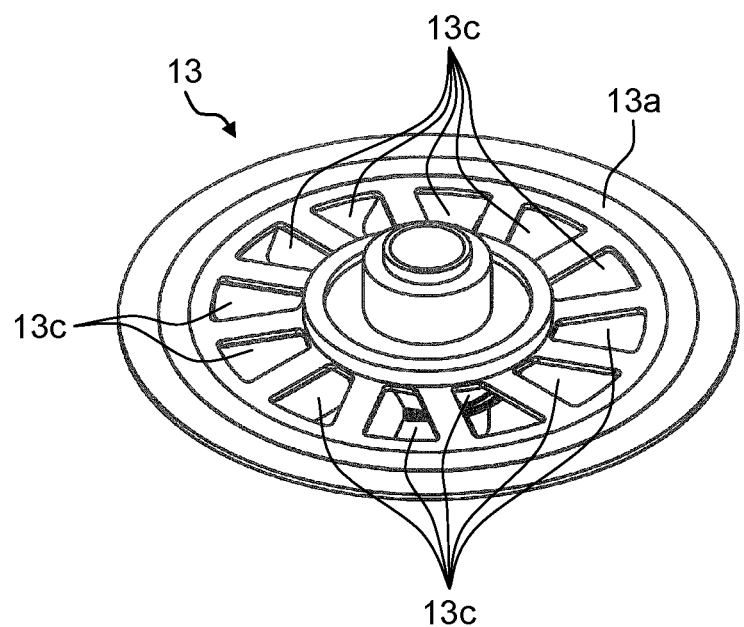
FIG. 7A is a perspective view of a first face side of a phosphor wheel of a phosphor wheel device included in the light conversion device shown in FIG. 2.
Figure 7B:
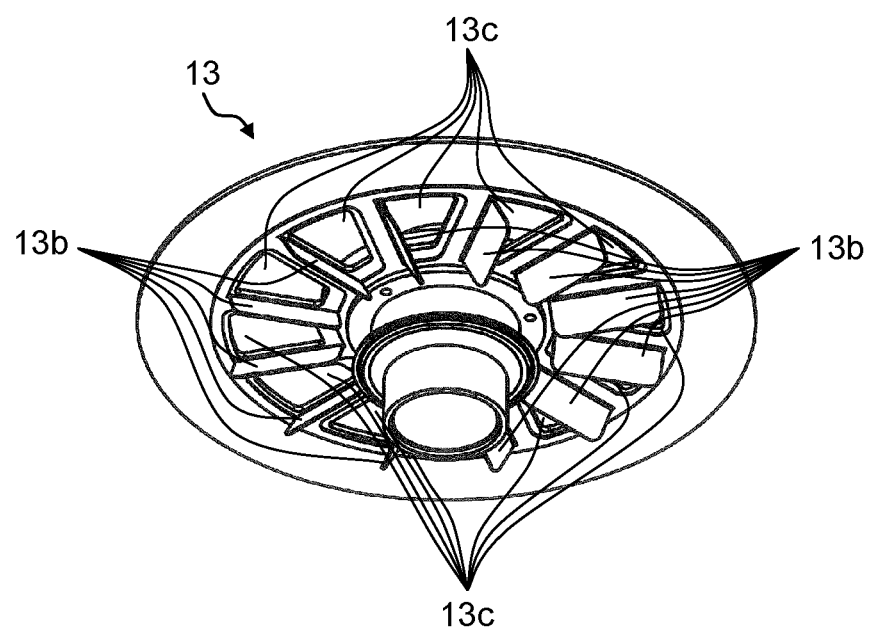
FIG. 7B is a perspective view of a second face side of the phosphor wheel shown in FIG. 7A.

As FIGS. 7A and 7B show, phosphor wheel 13 is a disc-shaped rotary member to be driven and rotated by motor 14, and includes phosphor layer 13a, circulation fan 13b, and openings 13c.

Phosphor layer 13a is formed by applying the phosphor annularly on phosphor wheel 13 at the face confronting optical lens 23, and converts the blue laser beams emitted from blue LDs 2a and 2b into the red light and the green light.

This structure allows phosphor wheel 13 to emit the red light and the green light.

As FIG. 5 shows, circulation fan 13b generates the airflow for discharging the heat that is generated when the phosphor of phosphor layer 13a of phosphor wheel 13 is excited in casing unit 11. Circulation fan 13b is disposed, as FIG. 7B shows, on the second face opposite to the first face, on which phosphor layer 13a is formed, of phosphor wheel 13.

Figure 8A:
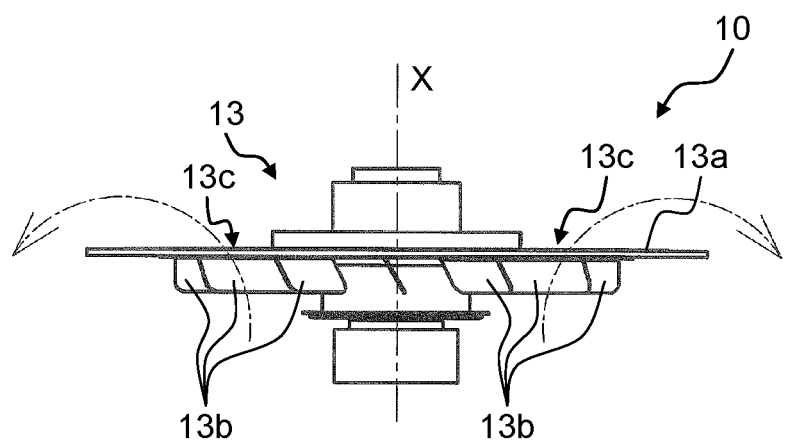
FIG. 8A is a lateral view showing a flow direction of an airflow generated by rotating the phosphor wheel shown in FIG. 7A and other drawings.
Figure 8B:
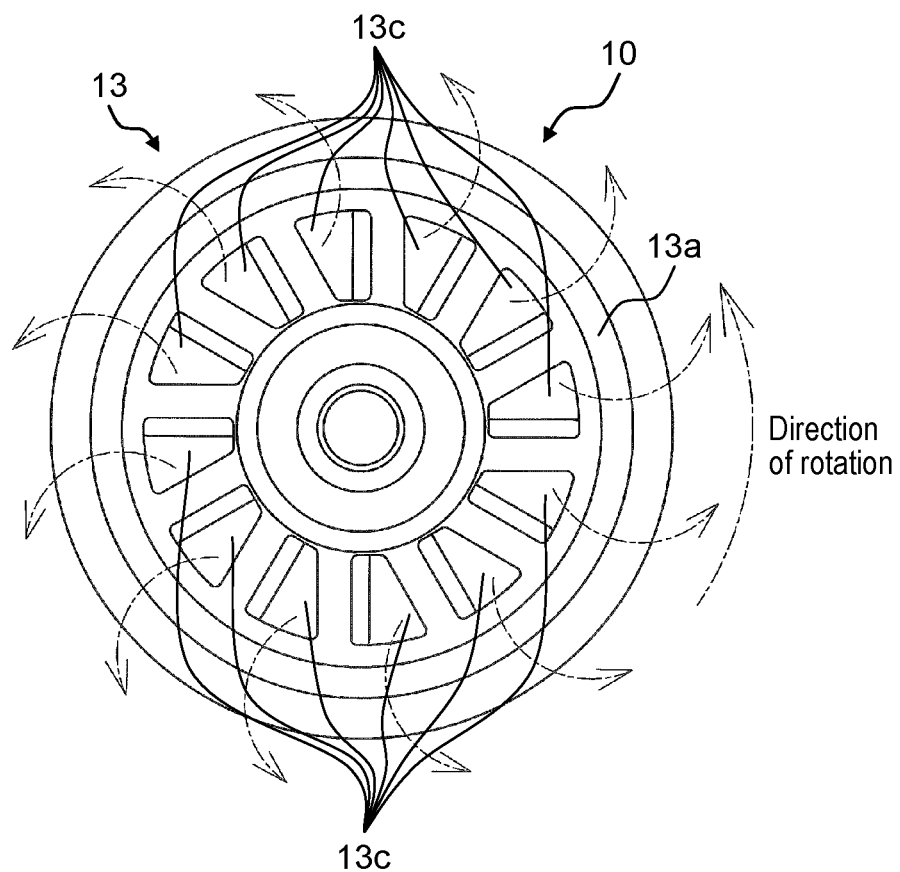
FIG. 8B is a plan view of what is shown in FIG. 8A.

When phosphor wheel 13 is driven and rotated, circulation fan 13b built in phosphor wheel 13 generates an axially upward airflow as shown in FIG. 8A.

In this embodiment, openings 13c are formed at a place corresponding to circulation fan 13b of phosphor wheel 13, so that the airflow generated by circulation fan 13b is transmitted toward phosphor layer 13a side via openings 13c.

The airflow generated by circulation fan 13b is heated around phosphor layer 13a of phosphor wheel 13 in the enclosed space formed in casing unit 11, and then passes through heat absorber 21 disposed in a space between outer cylindrical portion 11b and inner cylindrical portion 11c.

At this time, the heated air carries out heat-exchange with the small amount of water staying in heat pipe 24 connected to heat absorber 21, and the air is thus cooled. The cooled air then moves along the inner circumferential side of inner cylindrical portion 11c, and is transmitted toward phosphor layer 13a of phosphor wheel 13 via openings 13c.

The foregoing mechanism allows effectively cooling the phosphor of phosphor layer 13a of phosphor wheel 13.

As FIG. 7A shows, a plurality of openings 13c are provided on the inner circumferential side of the annular shaped phosphor layer 13a formed on the first face of phosphor wheel 1. Each of these openings 13c forms roughly a fan shape, and disposed along the circumferential line around axis X. Openings 13c are disposed correspondingly to circulation fan 13b.

The structure discussed above allows guiding the airflow generated by circulation fan 13b, through openings 13c, toward the first face on which phosphor layer 13a is formed as shown in FIG. 7B, and the airflow moves circumferentially outward with the aid of the centrifugal force.

Figure 9:
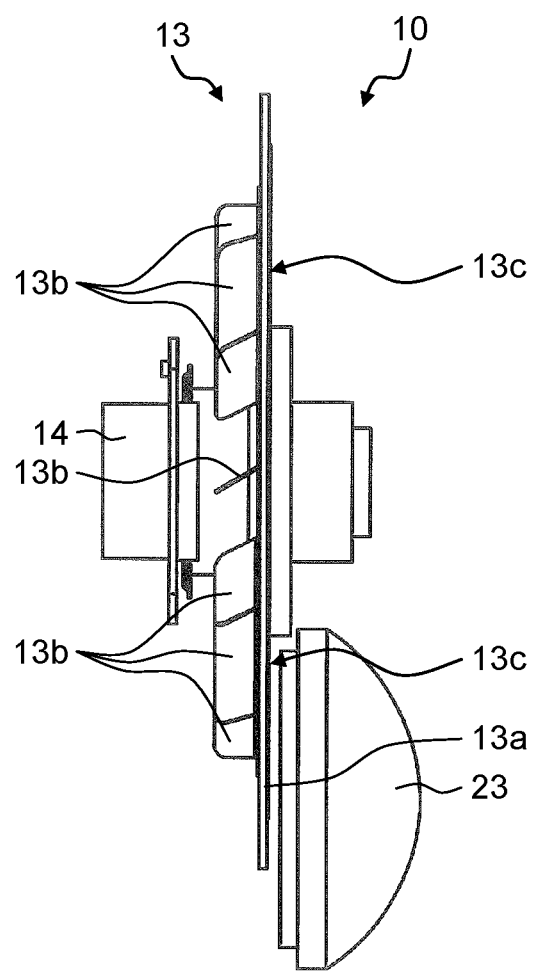
FIG. 9 is a lateral view of a lens disposed closely to a phosphor layer of the phosphor wheel shown in FIG. 7A and other drawings.

As FIG. 9 shows, motor 14 is connected to the rotary shaft of phosphor wheel 13, and drives/rotates phosphor wheel 13 as well as circulation fan 13b. Motor 14 is disposed, as shown in FIG. 5, in the flow path of the airflow having been cooled by heat absorber 21.

The structure discussed above allows cooling the motor 14 effectively with cooling air even if motor 14 generates heat attributable to continuous rotation of phosphor wheel 13.

Pressurization fan 15 is disposed in the airflow circulation path formed in casing unit 11, and blows air along the air flowing direction in the circulation path. In other words, pressurization fan 15 is disposed, as shown in FIG. 5, such that it can blow air along the flowing direction of the airflow generated by circulation fan 13b, and yet, pressurization fan 15 is disposed between phosphor wheel 13 and updraft guide 11e.

The placement of pressurization fan 15 at the lower-most downstream side in the circulation path of the airflow generated by circulation fan 13b allows strengthening the airflow at the lower-most downstream side where the airflow generated by circulation fan 13b becomes mostly weakened.

As a result, a flow rate of the airflow is increased around phosphor layer 13a of phosphor wheel 13 and motor 14, so that greater effect of the cooling can be expected, because heat is generated around these places (i.e. phosphor layer 13a and motor 14) in casing unit 11.

Circulation of Airflow Generated by Circulation Fan 13b

As discussed above, circulation fan 13b provided on the second face side of phosphor wheel 13 mounted to phosphor wheel device 10 is rotated together with phosphor wheel 13 integrally, whereby the airflow is generated in casing unit 11.

In other words, the airflow generated by circulation fan 13b flows upward as shown in FIG. 5, and passes through openings 13c of phosphor wheel 13.

The airflow generated by circulation fan 13b tends to flow radially outward due to the centrifugal force, nevertheless, fixed wall 21b of heat absorber 21 disposed around and radially outward circulation fan 13b restrains the flow from going toward outside the radial line. This mechanism thus allows restraining the air from flowing radially outward, and allows guiding the airflow efficiently to openings 13c.

Next, the airflow passing through openings 13c of phosphor wheel 13 is transmitted radially outward around the rotary shaft with the aid of spiral guide 11ab formed on an underside of lid portion 11a of casing unit 11 as well as the centrifugal force.

At this time, the airflow moving along phosphor layer 13a of phosphor wheel 13 is heated by the heat of the phosphor when the airflow passes closely to the surface of phosphor layer 13a.

The airflow heated by the phosphor is then blocked by the underside of lid portion 11a and moves downward as shown in FIG. 5, and passes through fins 21a of heat absorber 21.

At this time, heat absorber 21 absorbs the heat from the heated airflow, and cools the airflow.

The airflow cooled by heat absorber 21, then moves along a face extending from the lower end of heat absorber 21, along X-axis line, to bottom portion 11d, where updraft guide 11e guides the airflow toward phosphor wheel 13.

At this time, as shown in FIG. 5, the airflow rising with the aid of updraft guide 11e moves with a faster speed attributable to pressurization fan 15.

The airflow with the faster speed attributable to pressurization fan 15 then flows closely to motor 14, and cools motor 14. Then the airflow flows to circulation fan 13b again.

The foregoing mechanism allows the airflow generated by circulation fan 13b to effectively cool the heat generated from the phosphor of phosphor layer 13a of phosphor wheel 13.

A fan should be disposed, in general, at a place where the fan can blow air from the front directly to phosphor layer 13a in order to effectively cool the heat generated by phosphor layer 13a of phosphor wheel 13. Nevertheless, depending on the location of the fan, this structure will prevent optical lens 23 from being placed close enough to phosphor layer 13a of phosphor wheel 13 as shown in FIG. 9, or this structure might need a greater size of the device.

As discussed previously each of phosphor wheel device 10 and light conversion device 20 provided with phosphor wheel device 10 in accordance with this embodiment includes circulation fan 13b on a face opposite to phosphor layer 13a of phosphor wheel 13 in order to form the airflow for cooling phosphor layer 13a. On top of that, in this embodiment, openings 13c are prepared at a place corresponding to circulation fan 13b of phosphor wheel 13 in order to guide the airflow generated by circulation fan 13b toward phosphor layer 13a.

The structure discussed above allows maintaining the space for optical lens 23 on phosphor layer 13a side of phosphor wheel 13, and yet, circulation fan 13b disposed on the second face opposite to phosphor layer 13a allows generating the airflow that passes near to phosphor layer 13a.

As a result, the foregoing structure allows avoiding a greater size of the device, coexisting of circulation fan 13b and optical lens 23 with each other, and yet, cooling effectively the heat generated in the phosphor of phosphor layer 13a.

Other Embodiments

One of the embodiments of the present disclosure is discussed above, nevertheless the present disclosure is not limited to the embodiment discussed above, and it can be changed as far as it does not deviate from the gist of the present disclosure.

(A)

In the embodiment discussed above, pressurization fan 15 is provided at a space below phosphor wheel 13, as shown in FIG. 5, in order to circulate the airflow generated by circulation fan 13b within casing unit 11 efficiently; however, the present disclosure is not limited to this structure.

Figure 10:
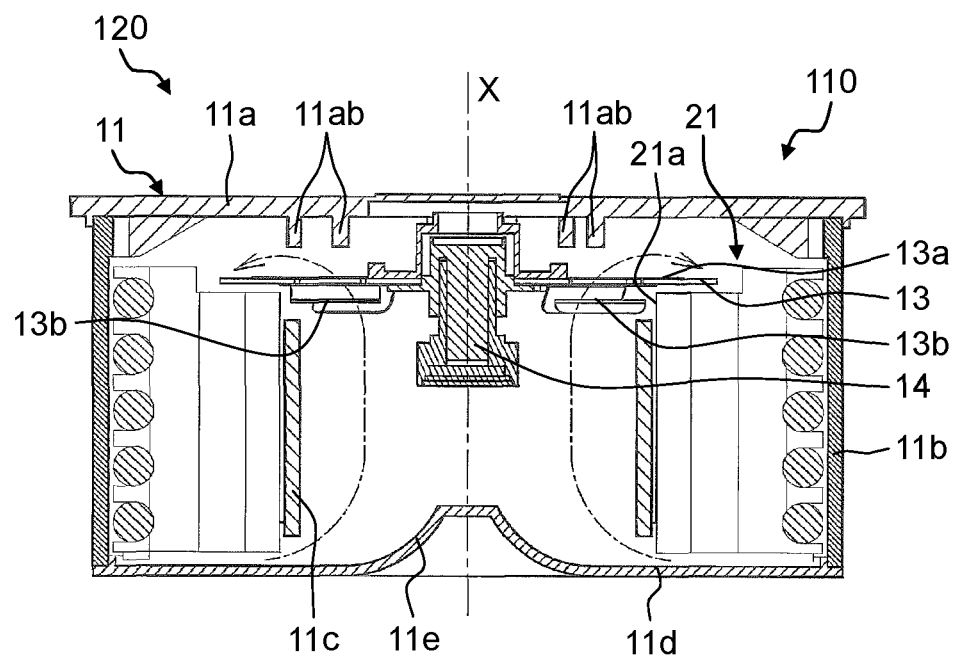
FIG. 10 is a sectional view of an interior structure of a light conversion device in accordance with another embodiment of the present disclosure.

For instance, as shown in FIG. 10, phosphor wheel device 110 and light conversion device 120 both having no pressurization fan in casing unit 11 can be fit to the present disclosure.

In this case, circulation fan 13b disposed on an opposite face to phosphor layer 13a of phosphor wheel 13 generates the airflow. The air containing the heat generated in phosphor layer 13a can be cooled by this airflow in heat absorber 21.

However, the wind force generated by circulation fan 13b is sometimes not enough for efficient circulation of the airflow passing through heat absorber 21. To overcome this problem, in the case of using a heat absorber having a fin structure inviting a greater pressure loss, it is preferable to prepare pressurization fan 15 that blows air in the same direction as that of the airflow generated by circulation fan 13b, although the structure becomes similar to that described in the first embodiment discussed previously.

(B)

In the first embodiment discussed previously, updraft guide 11e is provided, as shown in FIG. 5 and other drawings, on the top face of bottom portion 11d, viz. in the space below phosphor wheel 13 in casing unit 11, for the airflow to rise. Nevertheless, the present disclosure is not limited to this structure.

Figure 11:
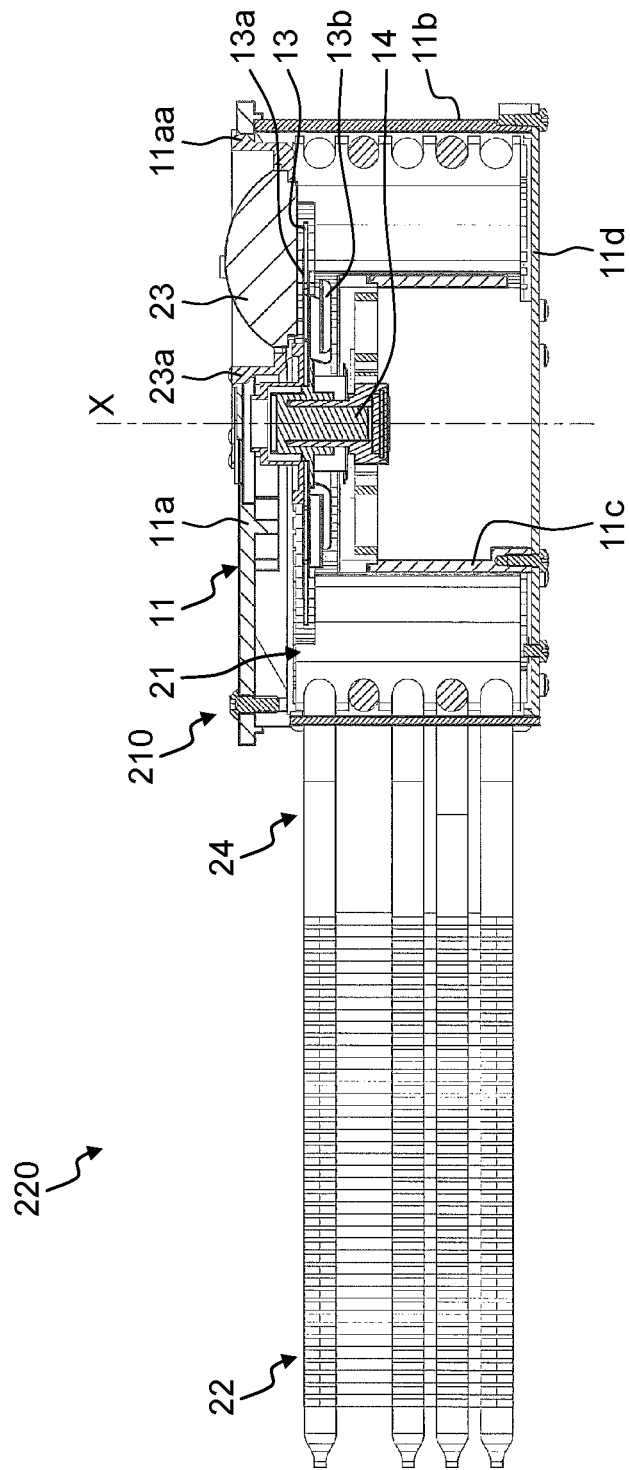
FIG. 11 is a sectional view of an interior structure of a light conversion device in accordance with still another embodiment of the present disclosure.

For instance, as shown in FIG. 11, phosphor wheel device 210 and light conversion device 220 both having no updraft guide 11e can be fit to the present disclosure.

In this case, the force for the airflow passing through heat absorber 21 to rise only depends on the wind force generated by circulation fan 13b, so that the airflow sometimes might not be circulated sufficiently.

To overcome this problem, pressurization fan 15 can be prepared for blowing air in the same direction as that of the airflow generated by circulation fan 13b, although this structure becomes a similar structure discussed in embodiment (A). This structure allows sufficiently circulating the airflow in casing unit 11 even if the structure has no updraft guide.

(C)

In the first embodiment discussed previously, as FIG. 2 and other drawings show, the heat generated from phosphor layer 13a of phosphor wheel 13 is absorbed by heat absorber 21 through air working as a medium, and then the heat is discharged to the outside from heat dissipater 22 thermally coupled to heat absorber 21 via heat pipe 24. However, the present disclosure is not limited to this structure.

Figure 12A:
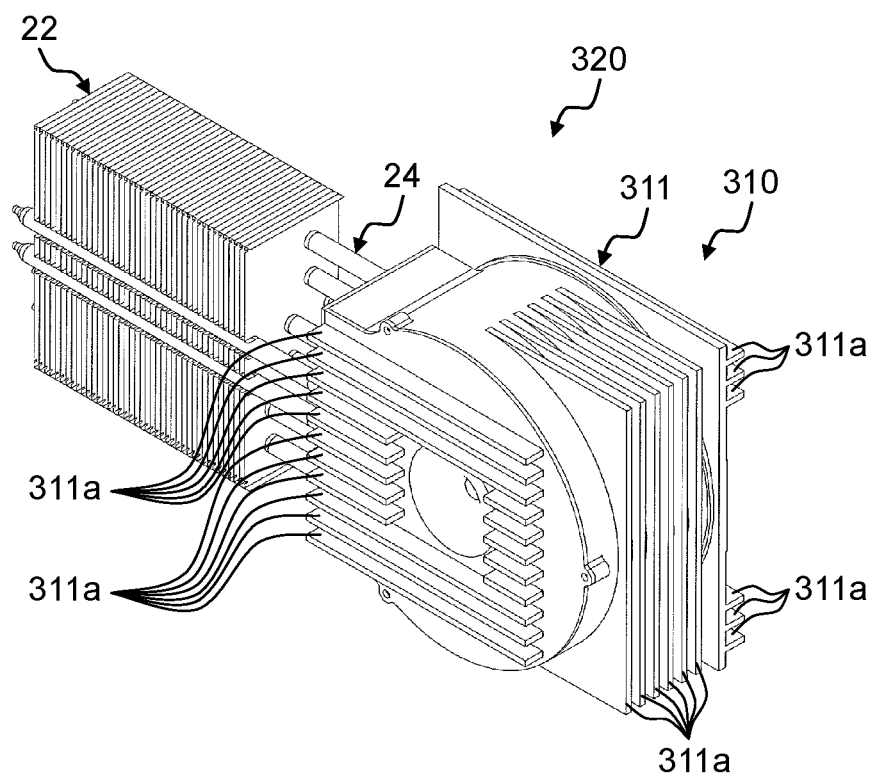
FIG. 12A is a perspective view of a light conversion device in accordance with another embodiment of the present disclosure.
Figure 12B:
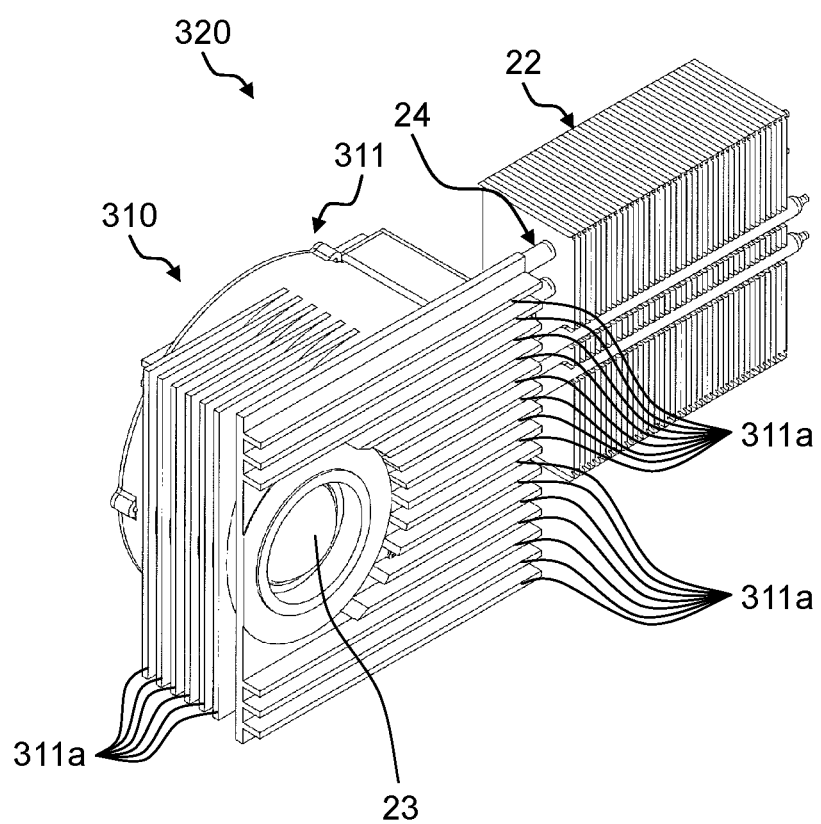
FIG. 12B is a perspective view of the light conversion device viewed from the opposite side to what is shown in FIG. 12A.

For instance, as FIGS. 12A and 12B show, outer wall fins 311a are provided on an outer face of casing unit 311 accommodating phosphor wheel device 310 and light conversion device 320, and the heat generated from a phosphor layer of a phosphor wheel can be dissipated via outer wall fins 311a.

This structure is provided with a heat discharge function to be carried out by outer wall fin 311a of casing unit 311 in addition to the heat dissipation function of heat dissipater 22, so that this structure allows discharging the heat generated in the phosphor layer more efficiently.

(D)

In the first embodiment discussed previously, the inner circumferential face of heat absorber 21 is used as fixed wall 21b in order to restrain the airflow from being transmitted radially outward. This airflow has been generated by circulation fan 13b disposed to phosphor wheel 13. The present disclosure; however, is not limited to this structure.

Figure 13:
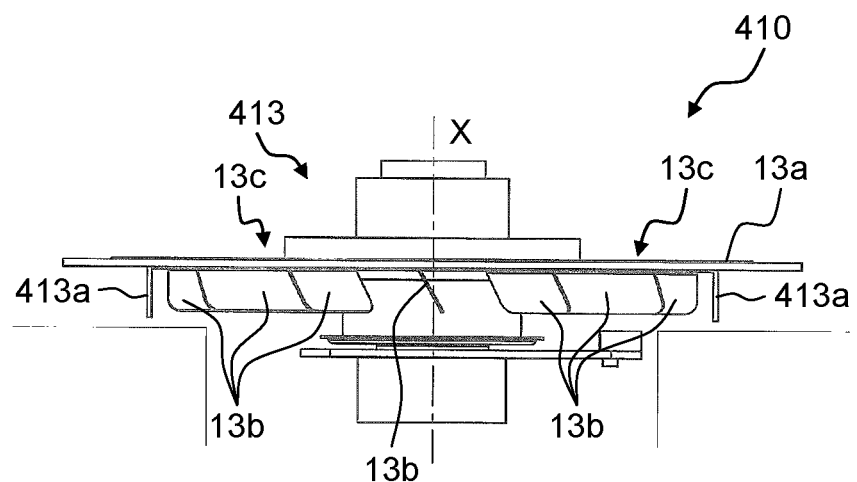
FIG. 13 is a lateral view of an interior structure of a light conversion device in accordance with yet still another embodiment of the present disclosure.

For instance, as shown in FIG. 13, phosphor wheel device 410 having an annular-shaped rotating wall 413a instead of fixed wall 21b can be fit to the present disclosure. Rotating wall 413a is disposed on a face, where circulation fan 13b is supposed to be disposed, of phosphor wheel 413.

In this phosphor wheel device 410, rotating wall 413a integrated with phosphor wheel 413 is rotated together with wheel 413, so that the airflow generated by circulation fan 13b can be restrained from flowing radially outward. As a result, the airflow can be guided efficiently toward phosphor layer 13a via openings 13c.

(E)

In the first embodiment discussed previously, the heat generated from phosphor layer 13a of phosphor wheel 13 is discharged outside by heat absorber 21 and heat dissipater 22 thermally coupled to each other with heat pipe 24. However, the present disclosure is not limited to this structure.

Figure 14:
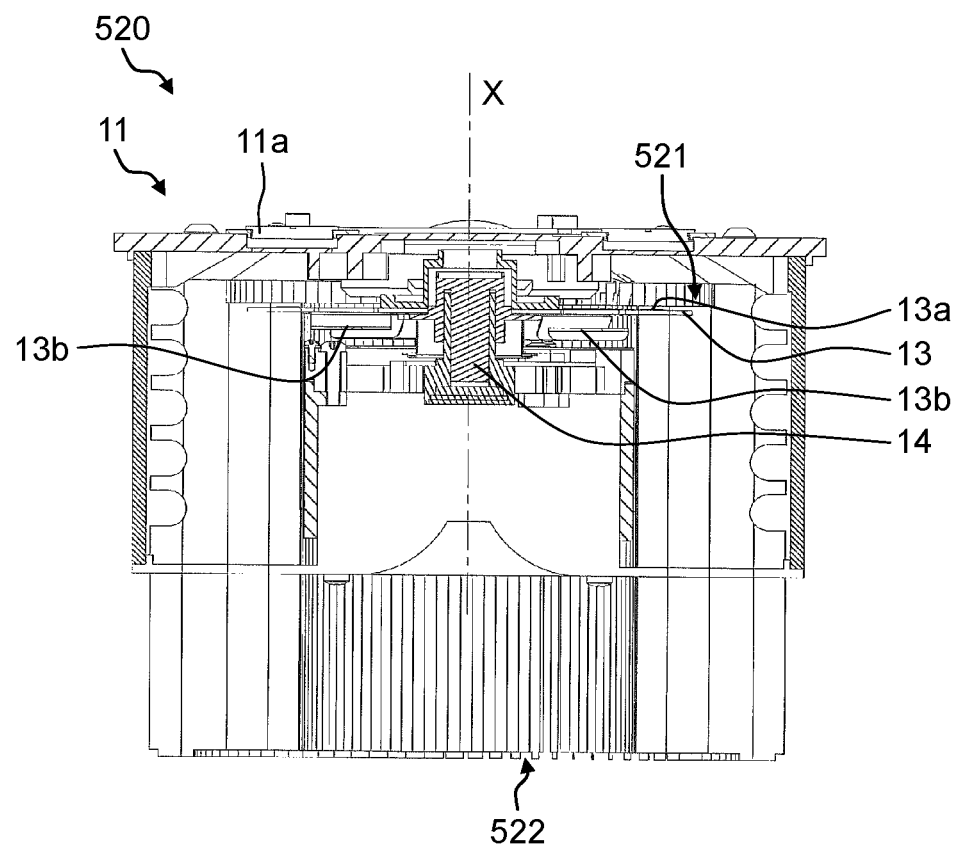
FIG. 14 is a sectional view of an interior structure of a light conversion device in accordance with still another embodiment of the present disclosure.

For instance, as FIG. 14 shows, light conversion device 520, in which heat absorber 521 is connected directly to heat dissipater 522, does not include a heat pipe. This light conversion device 520 can be also fit to the present disclosure.

In this case, however, heat absorber 521 is thermally connected to heat dissipater 522 by means of penetration through a partition wall of casing unit 11. This structure allows the heat generated from phosphor layer 13a of phosphor wheel 13 to circulate in casing unit 11 with the aid of circulation fan 13b, and the heat can be discharged outside by heat absorber 521 and heat dissipater 522.

(F)

In the first embodiment discussed previously, as FIG. 4B shows, heat absorber 21 formed of the fin structure, in which a plurality of fins 21a are disposed spirally, is used. However, the present disclosure is not limited to this structure.

Figure 15:
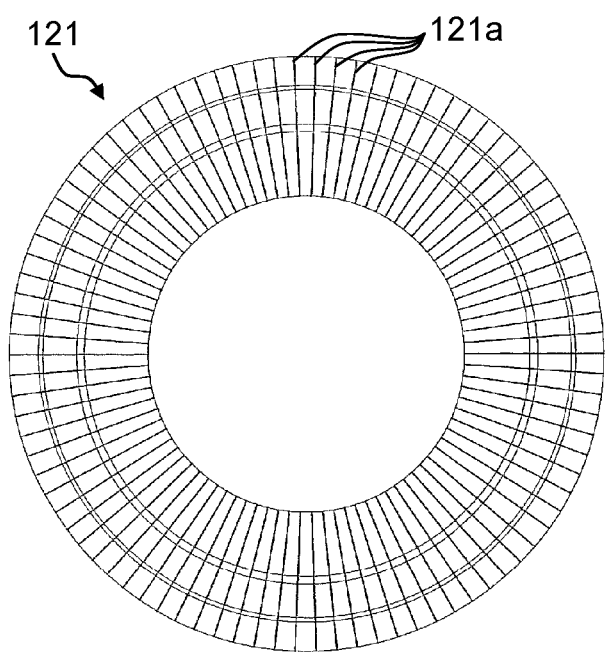
FIG. 15 is a plan view showing a structure of a heat absorber included in a light conversion device yet still another embodiment of the present disclosure.

For instance, as FIG. 15 shows, heat absorber 121 formed of a fin structure, in which a plurality of fins 121a are disposed radially, is used. This heat absorber 121 can be also fit to the present disclosure.

In this case, the foregoing structure allows the airflow generated by circulation fan 13b mounted to phosphor wheel 13 to pass through the fin structure of heat absorber 121, thereby cooling the airflow efficiently.

(G)

In the first embodiment discussed previously, phosphor wheel device 10 and light conversion device 20 in accordance with the present disclosure are mounted to projector 100 that employs the three-chip DLP method including three DMDs 7. However, the present disclosure is not limited to this structure.

For instance, the phosphor wheel device and the light conversion device in accordance with the present disclosure can be mounted to a projector that employs a one-chip DLP method in which one DMD is combined with a color wheel.

(H)

In the first embodiment discussed previously, the phosphor wheel device 10 and light conversion device 20 in accordance with the present disclosure are mounted to projector 100 employing the DLP method; however, the present disclosure is not limited to this structure.

For instance, the phosphor wheel device and the light conversion device in accordance with the present disclosure can be mounted to a projector that employs an LC (liquid crystal) method in which an LCD (liquid crystal display) or an LCOS (liquid crystal on silicon) is used.

(I)

In the first embodiment discussed previously, projector 100 is used as an example of a projection display apparatus in accordance with the present disclosure; however, the present disclosure is not limited to this example.

For instance, the structure disclosed in the present disclosure is applicable to projection display apparatuses other than projector 100, the projection display apparatuses include such as a rear-projection television receiver.

INDUSTRIAL APPLICABILITY

The light conversion device in accordance with the present disclosure efficiently cools the heat generated from the phosphor, thereby improving the reliability and the conversion efficiency, and yet maintaining the freedom degree of placing a light source optical system such as lenses. The light conversion device is thus applicable widely for being mounted to projection display apparatuses and others.

What is claimed is:

1. A phosphor wheel device comprising:
   a phosphor wheel being disc-shaped, and including an annular phosphor layer formed on a first face of the phosphor wheel and a plurality of openings disposed on an inner circumferential side of the annular phosphor layer;
   a circulation fan mounted to a second face opposite to the first face including the phosphor layer formed on the first face of the phosphor wheel, and blowing air through the openings to the phosphor layer side;
   a motor driving and rotating the phosphor wheel and the circulation fan; and
   a casing unit accommodating the phosphor wheel, the circulation fan, and the motor, and including a circulation path formed in the casing unit for an airflow generated by the circulation fan to circulate,
   wherein the casing unit includes an outer cylindrical portion and an inner cylindrical portion disposed substantially concentrically with the outer cylindrical portion inside the outer cylindrical portion, and both ends of the outer cylindrical portion communicate with both ends of the inner cylindrical portion.

2. The phosphor wheel device according to claim 1, wherein the openings are formed radially inside the inner cylindrical portion in a plan view.

3. The phosphor wheel device according to claim 1, wherein the circulation fan is disposed radially inside the inner cylindrical portion in a plan view.

4. The phosphor wheel device according to claim 1, wherein the circulation fan passes higher-temperature air through a heat absorber disposed in a space between the outer cylindrical portion and the inner cylindrical portion to turn the higher-temperature air to lower-temperature air, and then transmits the lower-temperature air from an inside of the inner cylindrical portion toward the phosphor wheel for cooling the phosphor layer.

5. The phosphor wheel device according to claim 4, wherein the motor is disposed in a flow path of the airflow cooled by the heat absorber.

6. The phosphor wheel device according to claim 4, wherein the heat absorber has a fin structure including a plurality of fins disposed spirally.

7. The phosphor wheel device according to claim 4, wherein the heat absorber has a fin structure including a plurality of fins disposed radially.

8. The phosphor wheel device according to claim 1, further comprising a pressurization fan disposed in the circulation path for blowing air along a flow direction of the airflow in the circulation path.

9. The phosphor wheel device according to claim 1, wherein the casing unit includes a portion exposed to outside air, and at least a part of the portion exposed to the outside air is made of metal.

10. The phosphor wheel device according to claim 1, wherein the casing unit includes a fin structure formed on at least a part of an exterior surface of the casing unit.

11. The phosphor wheel device according to claim 1, further comprising:
    a heat absorber for absorbing heat generated around the phosphor layer of the phosphor wheel;
    a heat dissipater thermally coupled to the heat absorber for dissipating heat of the airflow to an outside of the casing unit; and
    a heat pipe for coupling the heat absorber to the heat dissipater.

12. The phosphor wheel device according to claim 11, wherein the heat absorber and the heat dissipater are formed integrally, and coupled to each other thermally by means of penetration through a partition wall of the casing unit.

13. The phosphor wheel device according to claim 1, further comprising an annular wall portion disposed on an outer circumferential side of the circulation fan for restraining the airflow generated by the circulation fan from flowing along a radial direction from a rotation center of the circulation fan.

14. The phosphor wheel device according to claim 13, wherein the wall portion is fixedly disposed on the outer circumferential side of the circulation fan.

15. The phosphor wheel device according to claim 13, wherein the wall portion is coupled to one of the phosphor wheel and the circulation fan for being rotated integrally with the one of the phosphor wheel and the circulation fan.

16. A light conversion device comprising:
    the phosphor wheel device as defined in claim 1;
    a heat absorber for absorbing heat generated around the phosphor layer of the phosphor wheel;
    a heat dissipater thermally coupled to the heat absorber for dissipating heat of the airflow to an outside of the casing unit; and
    an optical lens mounted to an opening portion formed on the casing unit, passing excitation-light exciting phosphor of the phosphor layer through the optical lens, and condensing emission-light emitted from the phosphor of the phosphor layer.

17. A projection display apparatus comprising:
    the light conversion device as defined in claim 16;
    a light source for radiating light to excite phosphor of a phosphor layer;
    a display element for forming a projection image by using the light radiated from the light source; and
    an optical component for optically connecting the light source, the light conversion device, and the display element together.

* * * * *